Aug. 21, 1956   W. L. CARLSON   2,759,258
METHOD OF FORMING BUSHINGS
Filed May 14, 1953
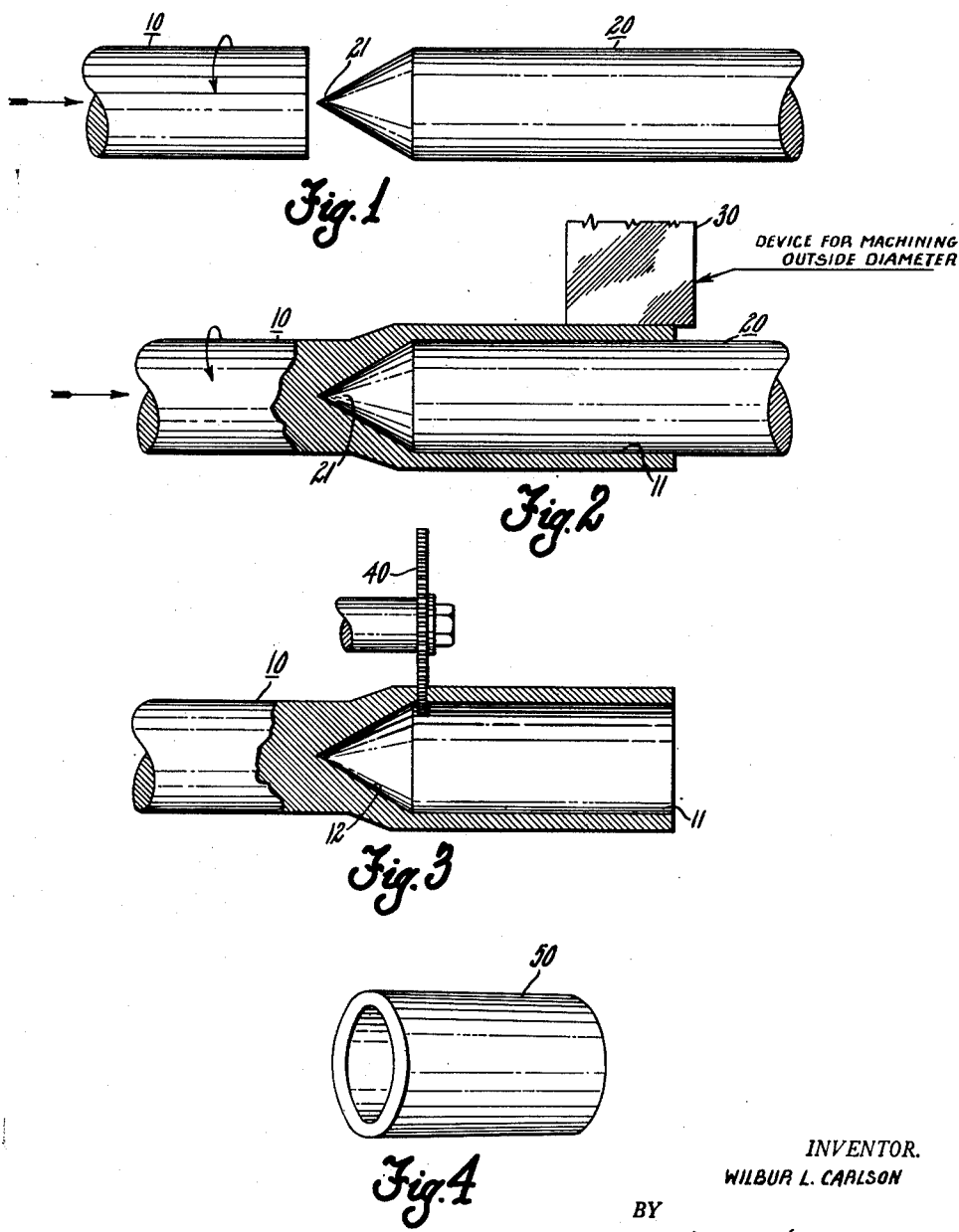
INVENTOR.
WILBUR L. CARLSON
BY
*George H. Strickland*
HIS ATTORNEY

United States Patent Office 2,759,258
Patented Aug. 21, 1956

2,759,258

METHOD OF FORMING BUSHINGS

Wilbur L. Carlson, Rochester, N. Y., assignor to General Motors Corporation, Detroit, Mich., a corporation of Delaware Application May 14, 1953, Serial No. 354,924

5 Claims. (Cl. 29—535)

The present invention relates to a method of forming annular members from a solid rod, and more particularly to a method of forming aluminum bushings.

Heretofore, in the manufacture of annular members from solid bars, or rods, it has been necessary to initially preheat the bars, or rods, to soften the same. However, by practicing this invention, the step of preheating is eliminated, thus, simplifying the manufacturing operation. Accordingly, among my objects are the provision of a method of forming annular members from a solid rod, and the further provision of a method of the aforesaid character wherein the necessity of preheating the solid rod is eliminated.

The aforementioned and other objects are accomplished in the present invention by employing the following method or process. A rod, of relatively ductile material, such as aluminum, is rotated about its longitudinal axis, and while rotating, the rod is moved longitudinally into contact with a suitably formed piercing tool, or mandrel, formed of a material substantially harder than the rod, such as sintered carbides. I have discovered that a substantial amount of heat is generated by friction between the relatively movable rod and tool, which heat softens the rod so that the rod material "flows" over the tool, as the rod is moved longitudinally relative to the tool. Thereafter, the rod is moved longitudinally away from the tool and the annular portion is severed from the rod leaving a cone-shaped recess in the exposed rod end to facilitate centering of the tool for the succeeding piercing operation. The outside diameter of the annular member, so formed, may be machined in situ, if desired.

Further objects and advantages of the present invention will be apparent from the following description, reference being had to the accompanying drawing wherein a preferred embodiment of the present invention is clearly shown.

In the drawing:

Fig. 1 is a view in elevation, showing one end of a rod and a piercing tool before the rod is moved lineally into contact with the tool.

Fig. 2 is a view similar to that of Fig. 1, partly in section and partly in elevation, showing the tool within the rod after the wall thereof has flowed over the end of the tool to form an annular portion, at which time, the outer periphery of the annular portion may be machined in situ.

Fig. 3 is a view illustrating the step of severing the annular portion from the rod.

Fig. 4 is a view in perspective of the severed annular member, or bushing.

With particular reference to the drawing, the sequence of steps used in carrying out the instant method are shown, in which a rod is indicated by the numeral 10 and a tool is indicated by the numeral 20. The rod 10 is composed of a relatively ductile metal such as aluminum. The tool 20 is formed with a tapered piercing point 21 and is composed of a sintered carbide such as carballoy, which materials are relatively hard. The composition of the rod and tool must be such that substantial quantities of heat are frictionally developed due to engagement and relative movement therebetween, the heat being sufficient to soften the metal of the rod to a point where it will flow over the periphery of the tool.

In carrying out the method of the instant invention, the rod 10, preferably of circular cross section, is rotated by any suitable means, not shown, about its longitudinal axis. The piercing tool 20 with its conical forming head portion 21 is held in a fixed position. The rotating rod 10 is forced longitudinally into contact with the piercing head portion 21 of the tool 20, thereby causing a substantial amount of heat to be developed by friction between the relatively moving rod and tool, which causes the rod material to soften so that the rod material will be displaced and caused to flow radially from the center to form a conical recess in the end portion thereof. Continued rotation and longitudinal movement of the rod 10 relative to the tool 20 will result in the formation of a circular recess 11, as shown in Fig. 2.

At this time, with the piercing tool 20 disposed within the recess 11 of the rod 10, the outside diameter of the recessed portion of the rod may be machined in situ, by any suitable means indicated by the numeral 30 in Fig. 2. Thereafter, the rod 10 is moved away from the tool 20 and rotation thereof is stopped. Finally a cutter 40 is brought into operative engagement with the recessed end of the rod 10 and the extremity thereof is severed therefrom to form an annular member, or bushing, 50, as shown in Fig. 4.

It should be noted that in severing the bushing 50 from the recessed end of rod 10, a cone-shaped recess 12 remains in the end of rod 10, which recess is used to facilitate centering of the piercing tool 20 during the succeeding forming operation. The aforegoing operations are repeated to form successive annular members, or bushings, and in such a manner a plurality of uniformly sized bushings may be produced from a rod.

By practicing the present invention, it is readily apparent that bushings can be rapidly manufactured without the deleterious formation of chips. It is further to be noted that the rod must be rotated rapidly in order that sufficient heat be developed by friction to raise the temperature of the rod material to a flowing condition. It has been found that with an aluminum rod and a carballoy piercing tool, a rotative speed of about 3000 R. P. M. is sufficient. It is to be understood that only relative rotation and longitudinal movement between the rod and the tool is required, although it is preferred to effect rotation and longitudinal movement of the rod by such means as an automatic screw machine while the tool is held stationary. Moreover, the process is particularly adapted for the manufacture of annular members, or bushings, of limited longitudinal extent.

While the embodiment of the present invention as herein disclosed, constitutes a preferred form, it is to be understood that other forms might be adopted.

What is claimed is as follows:

1. The method of forming a recessed member from a solid, unheated element, which comprises, rotating and moving the element longitudinally against a piercing tool to form a recess therein by flowing the material of the element over the tool due to the softening of the element caused by heat generated by frictional engagement between the relatively movable tool and element.

2. The method of forming a hollow member from a solid, unheated element, which comprises, rotating and moving the element longitudinally against a piercing tool to form a recess therein by flowing the material of the element over the tool due to the softening of the element caused by the heat of friction between the relatively movable element and tool, and, thereafter, severing the recessed portion of the element to form a hollow member.

3. The method of forming a hollow member from a solid, unheated element, which comprises, rotating and moving the element longitudinally against a piercing tool to form a recess therein by flowing the material of the element over the tool due to the softening of the element caused by the heat of friction between the relatively movable element and tool, machining the outer periphery of the recessed portion of the element, and, thereafter, severing the recessed portion of the element to form a hollow member.

4. The method of forming annular members from a solid, unheated element composed of aluminum, which includes the steps of rotating the element against a piercing tool composed of carballoy, effecting relative longitudinal movement between the element and the tool so as to form a recess in the end of said element by flowing the material of the element over the tool, and, thereafter, severing the recessed portion to form a hollow member.

5. The method of forming bushings from a solid, unheated element composed of a relatively ductile material, which includes the steps of effecting relative rotation between the element and a piercing tool composed of a material substantially harder than the element while the element is in engagement with the tool to thereby generate sufficient heat solely by friction to soften the material of the element, effecting relative longitudinal movement between said element and said tool to form a recess in the end of said element by flowing the material of the element over the tool, and, thereafter, severing the recessed end portion of the element to form a bushing.

References Cited in the file of this patent

UNITED STATES PATENTS

| | | |
|---|---|---|
| 1,452,535 | Sultemeyer | Apr. 24, 1923 |
| 1,472,922 | Lothrop | Nov. 6, 1923 |
| 2,273,931 | Byrnes | Feb. 24, 1942 |